(12) United States Patent
Zhan et al.

(10) Patent No.: US 10,699,818 B2
(45) Date of Patent: Jun. 30, 2020

(54) HEAT EXCHANGE MEDIUM, HEAT EXCHANGE SYSTEM, AND NUCLEAR REACTOR SYSTEM

(71) Applicant: INSTITUTE OF MODERN PHYSICS, CHINESE ACADEMY OF SCIENCES, Gansu (CN)

(72) Inventors: Wenlong Zhan, Gansu (CN); Lei Yang, Gansu (CN); Hushan Xu, Lanzhou (CN)

(73) Assignee: Institute of Modern Physics, Chinese Academy of Sciences, Gansu (CN)

(*) Notice: Subject to any disclaimer, the term of this patent is extended or adjusted under 35 U.S.C. 154(b) by 551 days.

(21) Appl. No.: 14/415,460

(22) PCT Filed: May 7, 2013

(86) PCT No.: PCT/CN2013/075266
§ 371 (c)(1),
(2) Date: Jan. 16, 2015

(87) PCT Pub. No.: WO2014/179935
PCT Pub. Date: Nov. 13, 2014

(65) Prior Publication Data
US 2015/0200024 A1    Jul. 16, 2015

(51) Int. Cl.
*G21C 15/18* (2006.01)
*G21C 15/28* (2006.01)
(Continued)

(52) U.S. Cl.
CPC .............. *G21C 15/28* (2013.01); *C09K 5/10* (2013.01); *C09K 5/14* (2013.01); *Y02E 30/40* (2013.01)

(58) Field of Classification Search
CPC ............. G21C 15/28; C09K 5/10; C09K 5/14
(Continued)

(56) References Cited

U.S. PATENT DOCUMENTS 3,033,773 A    5/1962  Schluderberg et al.
3,039,948 A *  6/1962  Krucoff .................... G21C 1/22
                                                          376/311
(Continued)

FOREIGN PATENT DOCUMENTS

CN    1329123 A    1/2002
CN    1422931 A    6/2003
(Continued)

OTHER PUBLICATIONS

International Search Report, PCT/CN2013/075266.
(Continued)

*Primary Examiner* — Lily C Garner
(74) *Attorney, Agent, or Firm* — Steven McMahon Zeller; Dykema Gossett PLLC

(57) ABSTRACT

Embodiments of the present invention provide a heat exchange medium comprising solid particles and a fluid. Embodiments of the present invention also provide a heat exchange system comprising the abovementioned heat exchange medium, a first heat exchanger, a mixing device disposed upstream of the first heat exchanger and configured to mix the solid particles and the fluid of the heat exchange medium and convey the mixed heat exchange medium to the first heat exchanger, a separating device disposed downstream of the first heat exchanger and configured to separate the solid particles from the fluid in the mixed heat exchange medium discharged by the first heat exchanger, a second heat exchanger, and a first conveying device configured to convey the solid particles separated by the separating device to the mixing device after having passed the separated solid particles through the second heat exchanger. In addition, embodiments of the present invention provide a nuclear reactor system comprising the abovementioned heat exchange system. The gas-solid or liquid-solid two-phase flow according to embodiments of the present invention has (Continued)

the following advantages. For example, it has a large thermal capacity, can be used with a low-pressure system, is non-corrosive, and can be processed off-line. The fission reactor according to embodiments of the present invention can be operated safely and reliably at a high power density or at an extremely high power density.

11 Claims, 4 Drawing Sheets

(51) Int. Cl.
*C09K 5/10* (2006.01)
*C09K 5/14* (2006.01)

(58) Field of Classification Search
USPC .......................................................... 376/402
See application file for complete search history.

(56) References Cited

U.S. PATENT DOCUMENTS

| | | | | |
|---|---|---|---|---|
| 3,900,366 | A | * 8/1975 | Sakaguchi | ............... G21C 9/00 376/250 |
| 2009/0173907 | A1 | 7/2009 | Dubois et al. | |
| 2011/0240261 | A1 | 10/2011 | Ahlbeck et al. | |
| 2012/0125590 | A1 | 5/2012 | Guckert et al. | |

FOREIGN PATENT DOCUMENTS

| | | | |
|---|---|---|---|
| CN | 101285657 | A | 10/2008 |
| CN | 101549394 | A | 7/2011 |
| CN | 102568624 | A | 6/2012 |
| CN | 102782079 | A | 11/2012 |
| CN | 101720488 | A | 8/2013 |
| GB | 824377 | * | 11/1959 |
| GB | 824377 | A | 11/1959 |
| GB | 855859 | A | 12/1960 |
| JP | S58110988 | A | 7/1983 |
| JP | H08338892 | A | 12/1996 |
| JP | 2006045492 | A | 2/2006 |
| JP | 2006263681 | A | 10/2006 |
| JP | 2008547233 | A | 12/2008 |
| JP | 2012530161 | A | 11/2012 |
| WO | 2004033980 | A1 | 4/2004 |
| WO | 2012052661 | A2 | 4/2012 |
| WO | 2013053442 | A1 | 4/2013 |

OTHER PUBLICATIONS

Written Opinion of International Search Report, PCT/CN2013/075266.
English Translation of International Search Report, PCT/CN2013/075266.
Office Action, dated Nov. 15, 2014, SIPO of China in counterpart Chinese Application No. 201310164940.X.
English Translation of Office Action, dated Nov. 15, 2014, SIPO of China in counterpart Chinese Application No. 201310164940.X.
Office Action, dated Jan. 22, 2016 in counterpart Japanese Patent Application No. 2015-521949.
English Translation of Office Action, dated Jan. 22, 2016 in counterpart Japanese Patent Application No. 2015-521949.
Extended European Search Report, dated Feb. 4, 2016 in counterpart European Patent Application No. 13884084.8.

* cited by examiner

HEAT EXCHANGE MEDIUM, HEAT EXCHANGE SYSTEM, AND NUCLEAR REACTOR SYSTEM

BACKGROUND OF THE INVENTION

1. Field of the Invention

The present invention relates to a heat exchange medium, a heat exchange system, and a nuclear reactor system.

2. Description of the Related Art

Generally, water, gas or liquid metal/molten salt is used as a cooling medium for a reactor.

Effective and safe heat exchange has always been important in design for an ultra-fast neutron spectrum and an extremely high power. It has always been a main target of the design of the reactor how to effectively carry away heat through a heat exchange medium in time, maintain a safe and stable operation of a system, and reduce requirements for structural material in the design in a high heat flux environment.

SUMMARY OF THE INVENTION

An object of the present invention is to provide a heat exchange medium, a heat exchange system, and a nuclear reactor system, which can considerably improve a heat exchange effect to solve the problem of carrying away heat at a high temperature and a high heat density.

In an embodiment of the present invention, there is provided a heat exchange medium comprising solid particles and a fluid.

In an embodiment of the present invention, the solid particles have a particle diameter of from 10 μm to 10 mm.

In an embodiment of the present invention, the fluid includes at least one of a gas and a liquid.

In an embodiment of the present invention, the fluid includes helium gas or carbon dioxide.

In an embodiment of the present invention, the solid particles have a density greater than that of the fluid.

In an embodiment of the present invention, the solid particles are made of at least one of beryllium, beryllium alloy, zirconium, zirconium alloy, titanium alloy, beryllium oxide, MAX phase material, silicon carbide, and graphite.

In an embodiment of the present invention, the heat exchange medium is configured to form a gas-solid two-phase flow or a liquid-solid two-phase flow.

In an embodiment of the present invention, the solid particles have at least one of a spherical shape, an ellipsoidal shape, and a polyhedral shape.

In accordance with an aspect of the present invention, there is provided a heat exchange system comprising: the abovementioned heat exchange medium, a loop, a first heat exchanger disposed in the loop, a second heat exchanger disposed in the hoop, and a heat exchange medium conveying device configured to circulate the heat exchange medium through the first heat exchanger and the second heat exchanger in the loop.

In accordance with an aspect of the present invention, there is provided a heat exchange system comprising: the abovementioned heat exchange medium, a first heat exchanger, a mixing device disposed upstream of the first heat exchanger and configured to mix the solid particles and the fluid of the heat exchange medium and convey the mixed heat exchange medium to the first heat exchanger, a separating device disposed downstream of the first heat exchanger and configured to separate the solid particles from the fluid in the heat exchange medium discharged by the first heat exchanger, a second heat exchanger, and a first conveying device configured to convey the solid particles separated by the separating device to the mixing device after having passed the separated solid particles through the second heat exchanger.

In an embodiment of the present invention, the heat exchange system further comprises: a third heat exchanger, and a second conveying device configured to convey the fluid separated by the separating device to the mixing device after having passed the separated fluid through the third heat exchanger.

In an embodiment of the present invention, the first heat exchanger comprises a barrel in which a heat exchange medium channel is formed.

In an embodiment of the present invention, the second heat exchanger comprises a barrel and a partition plate which is disposed in the barrel and which divides an inner chamber of the barrel into a plurality of heat exchange medium channels.

In an embodiment of the present invention, the heat exchange system further comprises a solid particle screening device disposed downstream of the separating device and configured to remove those of the solid particles having a particle size less than a predetermined particle size.

In an embodiment of the present invention, there is provided a nuclear reactor system comprising: a nuclear reactor, and the abovementioned heat exchange system, wherein the first heat exchanger is disposed inside the nuclear reactor, and the second heat exchanger is disposed outside the nuclear reactor.

In these embodiments of the present invention, the gas-solid or liquid-solid two-phase flow has the following advantages. For example, it has a large thermal capacity, can be used with a low-pressure system, is non-corrosive, and can be processed off-line. A fission reactor cooled by the gas-solid or liquid-solid two-phase cooling medium can be operated safely and reliably at a high power density or an extremely high power density.

DETAILED DESCRIPTION OF THE EMBODIMENTS

A detailed description of the invention will be made as below with reference to embodiments of the present invention taken in conjunction with the accompanying drawings.

Figure 1:
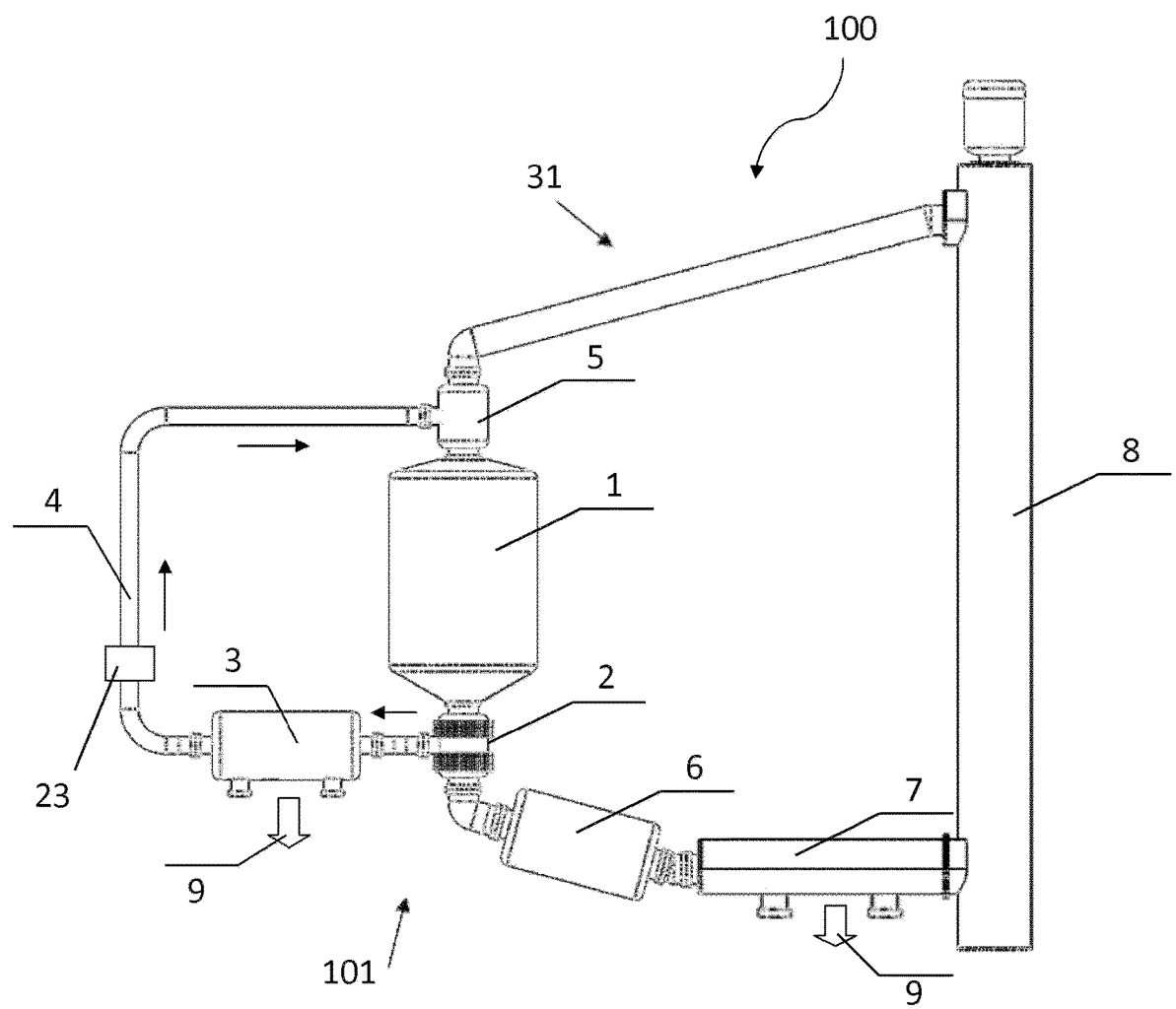
FIG. 1 is a schematic view of a fission reactor system according to an embodiment of the present invention.
Figure 2:
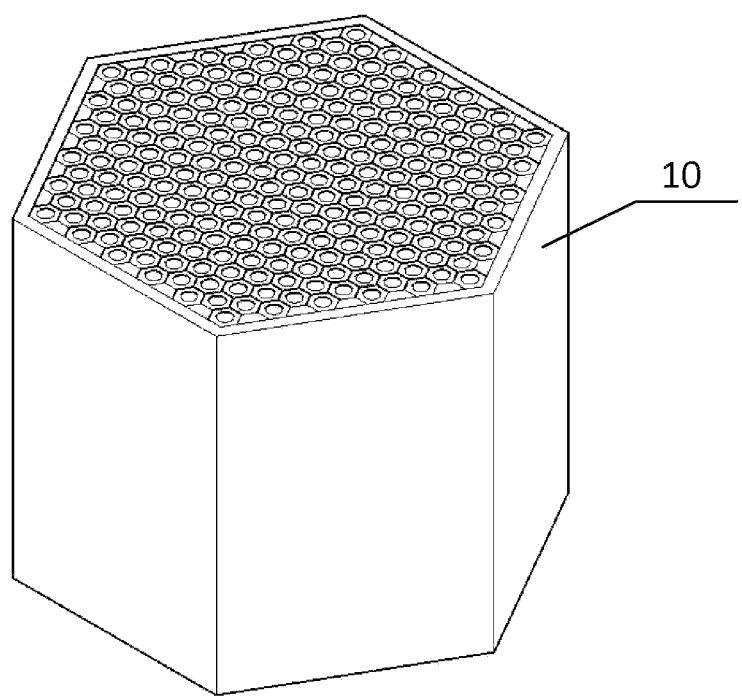
FIG. 2 is a schematic structural view of a reactor core of the fission reactor system according to the embodiment of the present invention.

As shown in FIG. 1, a nuclear reactor system 100 according to an exemplary embodiment of the present invention comprises a nuclear reactor 1 and a heat exchange system 101.

As shown in FIGS. 1-4, the heat exchange system 101 comprises a heat exchange medium 12, 15, a first heat exchanger 21, a second heat exchanger 7, a third heat exchanger 3, and pipes connecting these components. The first heat exchanger 21 is disposed inside the nuclear reactor 1 and may be disposed inside a reactor core 10 of the nuclear reactor 1, and the second heat exchanger 7 and the third heat exchanger 3 are disposed outside the nuclear reactor 1.

The heat exchange system 101 further comprises: a mixing device 5 disposed upstream of the first heat exchanger 21 and configured to mix the solid particles 12 and the fluid 15 of the heat exchange medium and convey the mixed heat exchange medium to the first heat exchanger 21, a separating device 2 disposed downstream of the first heat exchanger 21 and configured to separate the solid particles 12 from the fluid 15 in the heat exchange medium 12, 15 discharged by the first heat exchanger 21, and a first conveying device 8 configured to convey the solid particles 12 separated by the separating device 2 to the mixing device 5 after having passed the separated solid particles 12 through the second heat exchanger 7.

Figure 3:
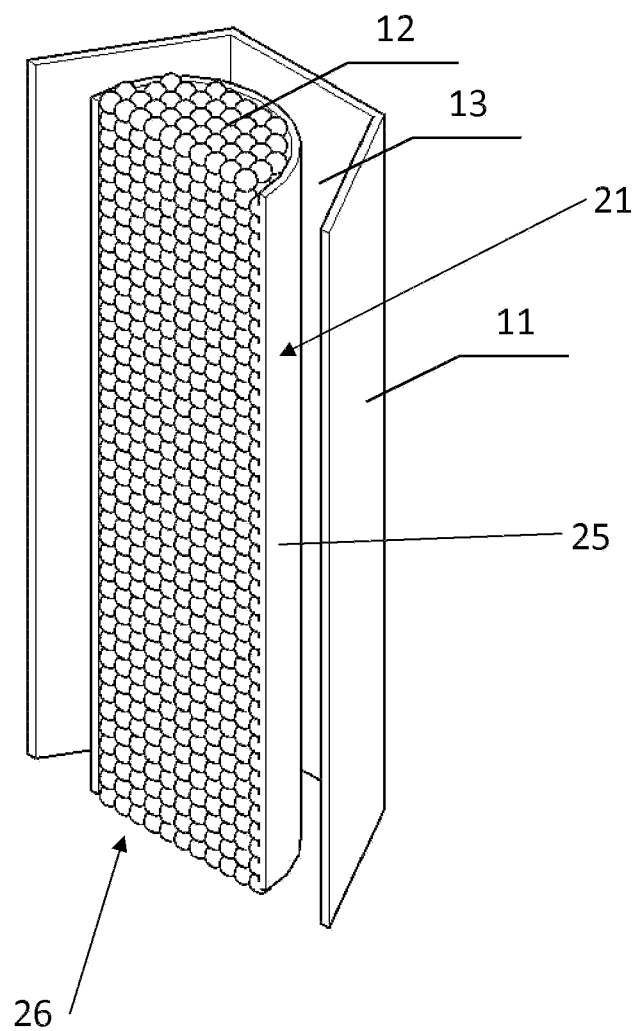
FIG. 3 is a schematic structural view of a fuel rod of the reactor core of the fission reactor system according to the embodiment of the present invention.

As shown in FIGS. 1-4, the heat exchange medium such as a gas-solid two-phase cooling medium flows through a fuel layer or the reactor core 10 via a heat exchange medium flow path to carry away heat generated by nuclear fuel. As shown in FIG. 3, nuclear fuel is placed in a fuel containing chamber 13 of the fuel rod 11 in the reactor core 10. The nuclear reactor 1 may be any appropriate nuclear reactor 1 such as a subcritical reactor with a blanket.

The separating device 2 may be any appropriate separating device such as a gravity separator and a centrifugal separator. Furthermore, dust in the heat exchange medium can also be separated by the separating device 2.

As shown in FIGS. 1-4, the heat exchange system 101 may further comprise: a third heat exchanger 3, and a second conveying device 23 configured to convey the fluid 15 separated by the separating device to the mixing device 5 after having passed the separated fluid 15 through the third heat exchanger 3. The second conveying device 23 may be any appropriate fluid conveying device, for example, a pump such as a gas pump or a liquid pump. The third heat exchanger 3 may be any appropriate fluid heat exchanger.

As shown in FIG. 1, the heat exchange system 101 may further comprise: a fluid loop 4, and a heat exchange medium injection device disposed downstream of the mixing device 5. The heat exchange medium injection device may be for example a funnel-shaped component or any other appreciate heat exchange medium drive device such as a pump. In order to adjust a flow rate of the heat exchange medium, the heat exchange system 101 may further comprise: a flow rate adjustment device disposed downstream of the mixing device 5. For example, the flow rate adjustment device may be a slideable gate which is mounted to the funnel-shaped member and which is driven by a linear motor. The linear motor may be controlled by a controller. Furthermore, if the heat exchange medium drive device such as a pump is used, a variable-flow heat exchange medium drive device such as a variable capacity pump may be used. The flow rate of the heat exchange medium may be controlled according to a relevant temperature detected by a sensor, such as temperature of a cooled object of the reactor core 10. In FIG. 1, the first conveying device 8 is a solid particle lifting device. The first conveying device 8 may be any appropriate solid particle conveying device or a bulk material conveying device, for example, a screw type solid particle conveyer or a pneumatic type solid particle conveyer. As shown in FIG. 3, the first heat exchanger 21 comprises a barrel 25 in which a heat exchange medium channel 26 is formed.

Figure 4:
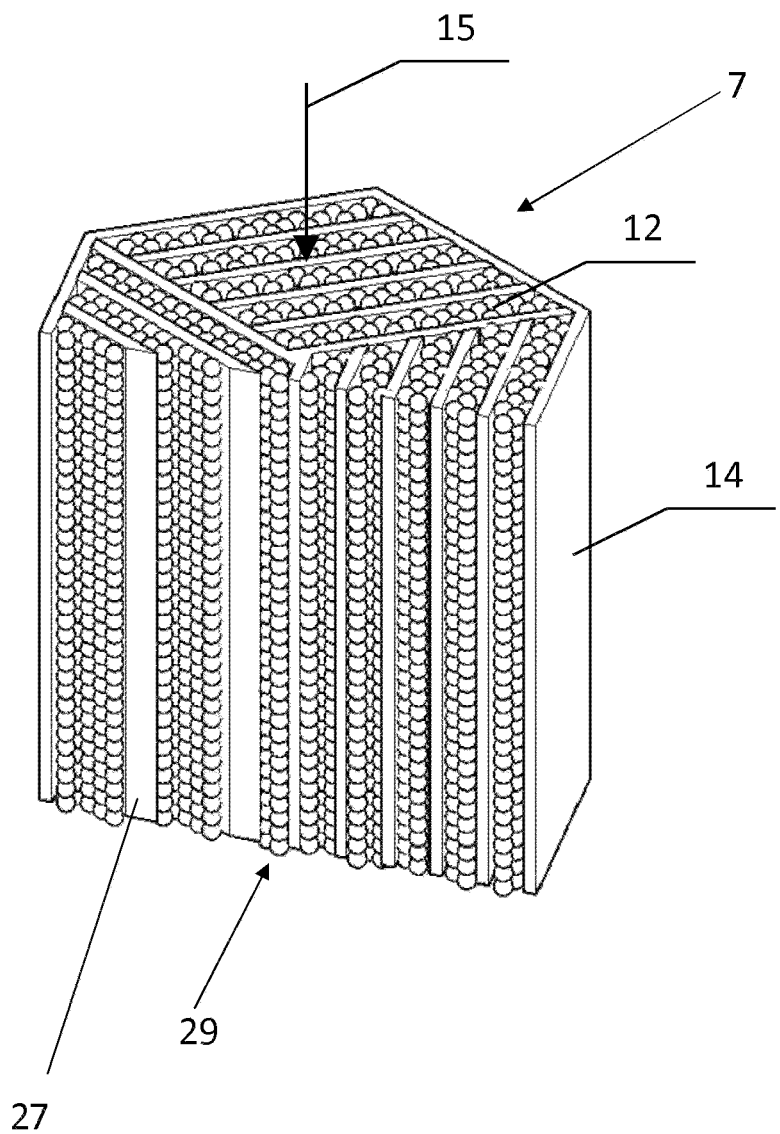
FIG. 4 is a schematic structural view of a heat exchanger according to an embodiment of the present invention.

As shown in FIG. 4, the second heat exchanger 7 comprises a barrel 14 and a partition plate 27. The partition plate 27 is disposed in the barrel 14 and divides an inner chamber of the barrel 14 into a plurality of heat exchange medium channels 29.

Alternatively, any of the first heat exchanger 21 and the second heat exchanger 7 may have one of the structures shown in FIGS. 3 and 4. Furthermore, the first heat exchanger 21 and the second heat exchanger 7 may also have any other appreciate structure.

As shown in FIG. 1, the heat exchange system 100 may further comprise a solid particle screening device 6 disposed downstream of the separating device 2 and configured to remove those of the solid particles 12 having a particle size less than a predetermined particle size, for example, fragments in the solid particles or fine dust. The solid particle screening device 6 may be a mesh screen, a centrifugal separator, a gravity separator and the like.

According to an embodiment of the present invention, referring to FIG. 1, the heat exchange system 100 may not comprise the mixing device 5, the separating device 2, the third heat exchanger 3, the second conveying device 23 and the pipe 4, but comprises only the first heat exchanger 21, the second heat exchanger 7, and the first conveying device 8. Specifically, referring to FIG. 1, the heat exchange system comprises: the heat exchange medium 12, 15, the loop 31, the first heat exchanger 21 disposed in the loop 31, the second heat exchanger 7 disposed in the loop 31, and the heat exchange medium conveying device 8 configured to circulate the heat exchange medium 12, 15 through the first heat exchanger 21 and the second heat exchanger 7 in the loop 31.

As shown in FIGS. 1-4, if a gas is used as the fluid, a pressure in the first heat exchanger 21 of the heat exchange system 100 may be less than 1 MPa. Compared with a simple gas heat exchange medium, the heat exchange medium according to embodiments of the present invention can effectively improve a cooling efficiency. Compared with the simple gas heat exchange medium, the gas pressure of the entire system can be reduced so that the system can operate more safely and reliably. The fission reactor in which the heat exchange medium according to embodiments of the present invention is used is suitable for a fast neutron spectrum or an ultra-fast neutron spectrum. The high-power density requirement can be satisfied. Uranium 235, thorium, uranium 238, a long-lived fission product, and a transuranium element can be used as a nuclear fuel. And, it can be used for transmutation of spent nuclear fuel and production of isotope.

The heat exchange medium according to embodiments of the present invention comprises: the solid particles 12 and the fluid 15. The solid particles 12 may have a particle diameter of from 10 μm to 10 mm. In accordance with actual requirements, the solid particles 12 may also have a particle diameter greater than or equal to 10 mm or less than or equal to 10 μm, or else, may also have a particle diameter of from 100 μm to 10 mm. The particle diameters of all of the solid particles 12 may be substantially the same or different from one another, or may be substantially within a range.

The fluid in the heat exchange medium may include at least one of a gas and a liquid. For example, the fluid includes a gas or a liquid. The gas for a high-temperature reactor may be a helium gas, and the gas for a low-temperature reactor may be carbon dioxide. Moreover, the fluid may also be solid at a normal atmospheric temperature, but is a liquid fluid at an operation temperature. In addition, the fluid may also be any other fluids that can form a two-phase flow together with the solid particles or that can drive the solid particles to move. The solid particles may be made of at least one of metal, metallic compound, ceramic material, and graphite. For example, the solid particles are made of at least one of beryllium, beryllium alloy, zirconium, zirconium alloy, titanium alloy, beryllium oxide, MAX phase material, silicon carbide, and graphite. The solid particles may also be made of any other appropriate materials. The solid particles may have any appropriate shape such as any regular shapes or any irregular shapes. As an example, the solid particles may have at least one of a spherical shape, an ellipsoidal shape, and a polyhedral shape. The solid particles may have a density greater than that of the fluid such as a liquid or a gas.

The heat exchange medium may be configured to form a gas-solid two-phase flow or a liquid-solid two-phase flow. In use, the heat exchange medium may form a gas-solid two-phase flow or a liquid-solid two-phase flow. Therefore, any appropriate device for conveying the gas-solid two-phase flow or the liquid-solid two-phase flow may be used to convey the heat exchange medium.

For example, the solid particles 12 are stacked to form a ball bed structure having certain porosity, and move at a flow rate; while the fluid fills within gaps among the solid particles 12 and moves at another flow rate. With this structure, the two-phase heat exchange medium can enhance a heat exchange effect by the following four main ways of: improving a heat capacity per unit volume, improving a thermal conductivity, improving a heat transfer coefficient, and enhancing radiative heat transfer.

Compared with a conventional single-phase medium, the heat exchange medium according to embodiments of the present invention, such as the gas-solid two-phase cooling medium, can carry out a better heat exchange and achieve a greater cooling of the system structure in situations where the enhanced heat exchange is required. In addition, solid material having good thermal conductivity and heat capacity per unit volume may be selected as the solid particles 12 in the heat exchange medium. For example, beryllium and beryllium alloy, zirconium alloy and compound of zirconium, or titanium alloy and compound of titanium, or the like may be used. A fluid having a good fluidity but a smaller density than the solid particles may be selected as the fluid of the heat exchange medium, and such fluid includes, but is not limited to, helium gas, carbon dioxide and the like.

As shown in FIGS. 1-4, according to an embodiment of the present invention, the gas-solid two-phase heat exchange medium flows through the reactor core 10 via a heat exchange medium flow path, to carry away heat generated by nuclear fuel. For an extremely high-power density nuclear reactor, the gas-solid two-phase heat exchange medium can carry away such a great quantity of heat from the reactor core so as to improve a neutron flux in the reactor core. After the gas-solid two-phase heat exchange medium carries away the heat from the reactor core, the gas and the solid particles in the gas-solid two-phase heat exchange medium are separated by a separating device 2 such as a gas-solid particle separating device. After the separating, the gas enters the gas flow path 4 in which the second conveying device 23 such as a pump is disposed to drive and convey the gas, and then the heat in the gas is carried away by passing through a gas heat exchanger 7 having a cooling loop 9. The gas is then conveyed to the mixing device 5 such as a gas-solid particle mixing device. The solid particles 12 reach the second heat exchanger 7 through an inclined conveying channel. In the second heat exchanger 7, the remaining heat in the solid particles 12 is carried away through a cooling loop 9. The solid particles 12 are re-injected into the mixing device 5 such as a gas-solid particle mixing device by the first conveying device 8 such as a mechanical or pneumatic lifting conveying system, so as to re-form the gas-solid two-phase heat exchange medium. For example, a standard fluidized bed mixer may be used as the gas-solid particle mixing device. When the gas passes through the gaps among the solid particles, the solid particles are driven to seethe, and when a flow speed of the gas reaches or exceeds a critical fluidizing velocity of the solid particles, the solid particles exhibit a fluidity similar to that of a liquid. With the abovementioned circulation process, heat is continuously carried away from the reactor, and the circulation speed is determined by the power density of the system. The more the power density is, the more the circulation speed is. In this way, the entire system can satisfy the requirements for safe and reliable operation at a high thermal power density. The heat carried away by the cooling loop 9 can be used to drive a generator to generate electric power.

The heat exchange medium according to embodiments of the present invention, such as the gas-solid two-phase heat exchange medium, may be driven in such a way that the fluid and the solid particles are separately driven. A conventional fluid driving apparatus may be used for driving the fluid, and there are also mature industrial designs and products used for driving the solid particles. Alternatively, the heat exchange medium according to embodiments of the present invention, such as the gas-solid two-phase heat exchange medium, may be driven in such a way that the fluid and the solid particles are driven together.

The heat exchange medium according to embodiments of the present invention, such as the gas-solid two-phase cooling medium, has the following advantages. For example, it has a large thermal capacity, can be used with a low-pressure system, is non-corrosive, and can be processed off-line. In addition, mature subsystems in the engineering application, such as a low-pressure gas system and a solid particle conveying system, may be used as the system structure and components. A fission reactor cooled by the heat exchange medium according to embodiments of the present invention can be operated safely and reliably at a high power density or at an extremely high power density. In the fission reactor, uranium 235, thorium, uranium 238, long-lived fission product, and transuranium element can be used as nuclear fuels, in addition to conventional nuclear fuels. The fission reactor according to embodiments of the present invention can be used for generation of energy source, transmutation of spent nuclear fuel, production of isotope, and irradiation of material.

What is claimed is:

1. A heat exchange system, comprising:
   a heat exchange medium comprising solid particles and a fluid;
   a first heat exchanger;
   a mixing device located above the first heat exchanger, disposed upstream of the first heat exchanger and configured to mix the solid particles and the fluid of the heat exchange medium and convey the mixed heat exchange medium to the first heat exchanger;
   a separating device located below the first heat exchanger, disposed downstream of the first heat exchanger and configured to separate the solid particles from the fluid in the heat exchange medium discharged by the first heat exchanger;
   a solid particle circulating loop configured to convey the separated solid particles from the separating device towards the mixing device; and a fluid circulating loop configured to convey the separated fluid from the separating device towards the mixing device, wherein the solid particle circulating loop comprises:
   a second heat exchanger configured to remove heat from the separated solid particles, wherein the separated solid particles enter the second heat exchanger after being discharged from the separating device; and
   a first conveying device configured to convey the solid particles from the second heat exchanger to the mixing device; and wherein the fluid circulating loop comprises:
   a third heat exchanger configured to remove heat from the separated fluid; and
   a second conveying device configured to convey the separated fluid from the third heat exchanger to the mixing device.

2. The heat exchange system of claim 1, wherein at least one of the first heat exchanger and the second heat exchanger comprises a barrel in which a heat exchange medium channel is formed.

3. The heat exchange system of claim 1, wherein at least one of the first heat exchanger and the second heat exchanger comprises a barrel, and a partition plate which is disposed in the barrel and which divides an inner chamber of the barrel into a plurality of heat exchange medium channels.

4. The heat exchange system of claim 1, wherein the solid particle circulating loop further comprises a solid particle screening device disposed upstream of the second heat exchanger, the screening device being configured to remove those of the solid particles having a particle size less than a predetermined particle size.

5. The heat exchange system of claim 1, wherein the solid particles have a particle diameter of from 10 μm to 10 mm.

6. The heat exchange system of claim 1, wherein the fluid includes at least one of a gas and a liquid.

7. The heat exchange system of claim 1, wherein the fluid includes helium gas or carbon dioxide.

8. The heat exchange system of claim 1, wherein the solid particles have a density greater than that of the fluid.

9. The heat exchange system of claim 1, wherein the solid particles are made of at least one of beryllium, beryllium alloy, zirconium, zirconium alloy, titanium alloy, beryllium oxide, MAX phase material, silicon carbide, and graphite.

10. The heat exchange system of claim 1, wherein the heat exchange medium is configured to form a gas-solid two-phase flow or a liquid-solid two-phase flow.

11. The heat exchange system of claim 1, wherein the solid particles have at least one of a spherical shape, an ellipsoidal shape, and a polyhedral shape.

* * * * *